May 13, 1941.  A. CROCE ET AL  2,241,633
PLANTER
Filed Dec. 16, 1938  2 Sheets-Sheet 1
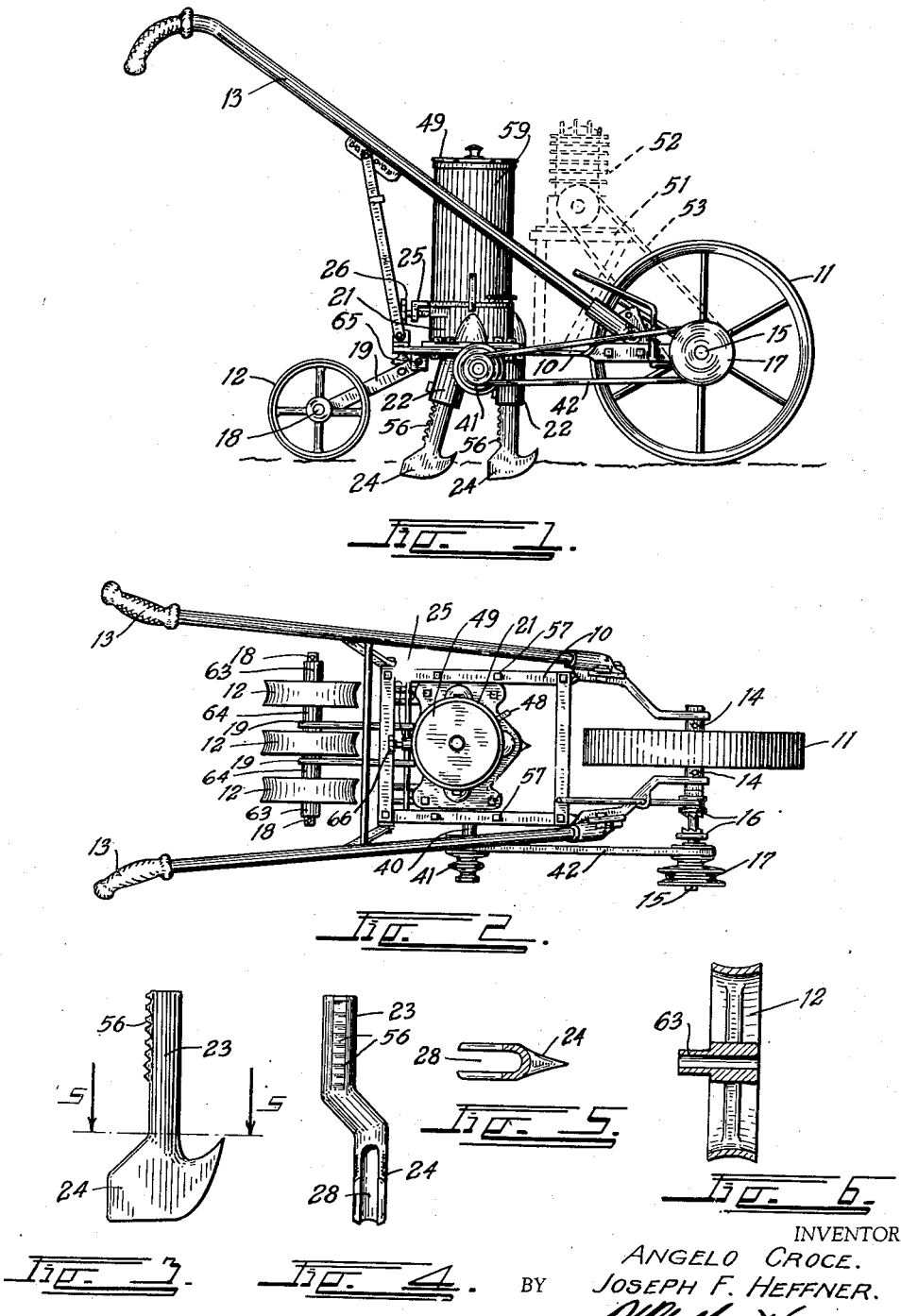
INVENTORS
ANGELO CROCE.
JOSEPH F. HEFFNER.
BY
ATTORNEY.

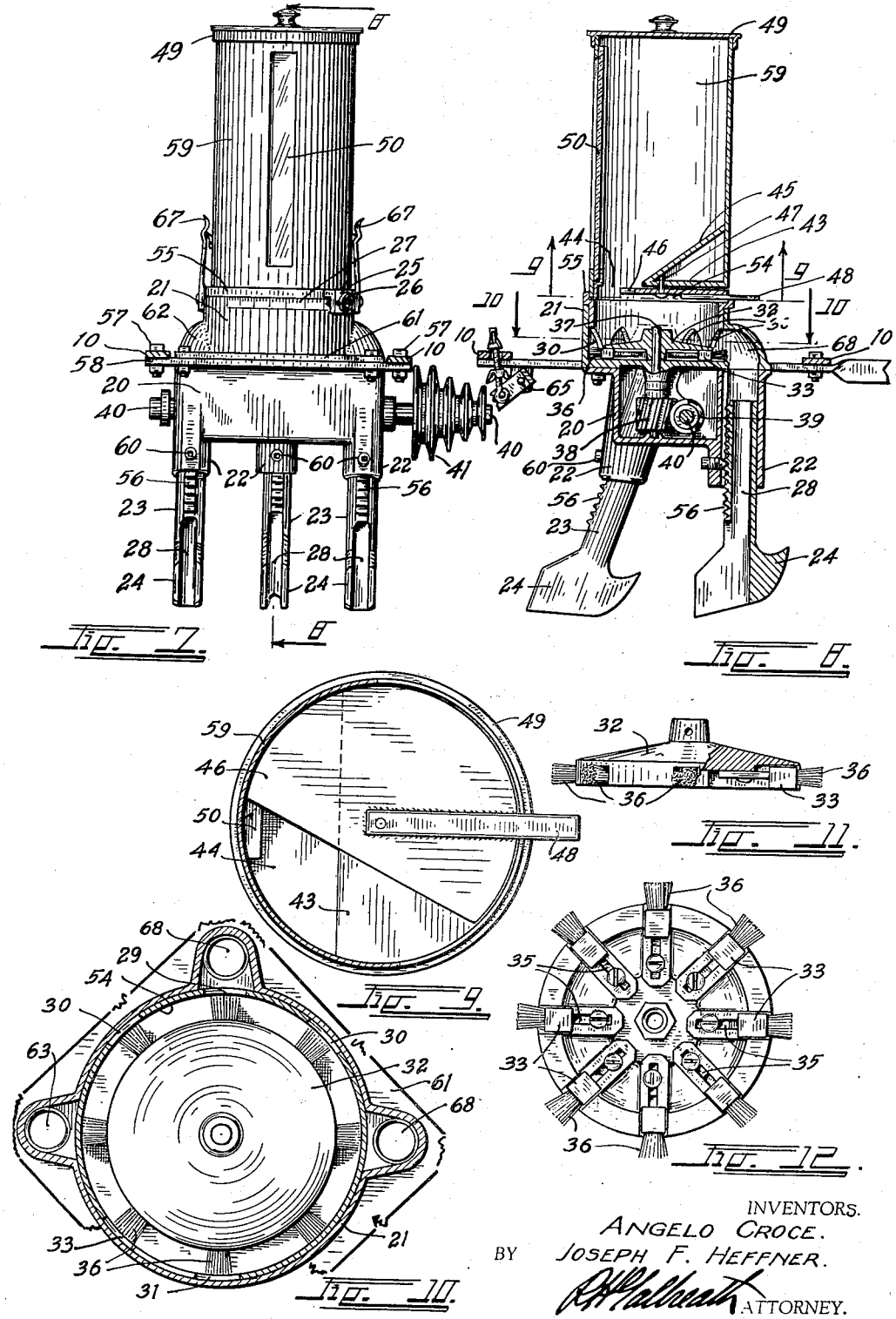

Patented May 13, 1941

2,241,633

UNITED STATES PATENT OFFICE 2,241,633

PLANTER

Angelo Croce, Welby, and Joseph F. Heffner, Denver, Colo.

Application December 16, 1938, Serial No. 246,099

4 Claims. (Cl. 221—125)

This invention relates to a multiple row planting machine and is more particularly designed for use by vegetable gardeners for planting lettuce, carrots, radishes, turnips, and similar seed crops.

The principal object of the invention is to provide a highly efficient machine in which the rate of seed flow can be accurately adjusted and will be uniformly maintained; in which two or more rows of any desired spacing may be planted simultaneously; and in which the seed carrier or reservoirs can be quickly and easily exchanged for other reservoirs carrying different types of seeds thus making the machine adaptable to plant a variety of different vegetables without requiring the seed hoppers to be emptied and refilled.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a side elevation of the improved planting machine.

Fig. 2 is a plan view thereof.

Fig. 3 is a detail side elevation of the offset form of planting plow.

Fig. 4 is a rear view of the planting plow of Fig. 3.

Fig. 5 is a horizontal section through the planting plow, taken on the line 5—5, Fig. 3.

Fig. 6 is an enlarged vertical section through one of the press wheels employed for closing the furrow after the planting is completed.

Fig. 7 is an enlarged rear elevation of the complete feed hopper and planting mechanism removed from the machine frame.

Fig. 8 is an enlarged vertical section through the feed hopper and planting mechanism taken on the line 8—8, Fig. 7.

Fig. 9 is an enlarged cross section through the feed hopper looking upwardly on the line 9—9, Fig. 8.

Fig. 10 is an enlarged horizontal cross section through the seed feeding and distributing mechanism, taken on the line 10—10, Fig. 8 with the housing flanges broken away.

Fig. 11 is an enlarged view of the seed distributing brush, partly in section.

Fig. 12 is an enlarged detail bottom view of the distributing brush.

The improved planter may be mounted on a horizontal frame 10 which is supported at its forward extremity on a ground engaging wheel 11 and at its rearward extremity upon furrow press wheels 12. A pair of guide handles 13 extend upwardly and rearwardly from the frame 10. The hub 14 of the wheel 11 is secured on a rotatable axle 15. A toothed clutch 16 is keyed on the axle by means of which the rotative movement of the wheel 11 may be communicated to a loose stepped pulley 17.

The machine as illustrated is designed for planting one, two or three rows simultaneously. When planting three rows, three of the press wheels 12 are employed. These wheels are removably mounted upon a removable axle 18 supported in a hinged bracket 19 extending downwardly and rearwardly from a pivot 65 on the frame 10. The angle of projection of the bracket, and the vertical position of the press wheels, can be varied by means of two wing nuts on a brace bolt 66, see Fig. 8.

If the machine is to be used for planting a single row the two outside wheels 12 may be removed from the axle 18. For planting a double row, the middle wheel 12 may be removed from the axle. It will be noted that the outside press wheels are provided with an extension hub 63 at one side only. When these extensions are turned outwardly, as shown in Fig. 2, the outer wheels ride against spacing sleeves 64 and are in the "narrow" position. If these wheels are turned around so that the extensions ride against the spacing sleeves the wheels will be thrown outward into the "wide" three row position.

The seed distributing mechanism employes a lower housing 20 bolted to projecting flanges 61 and an upper housing 21. The lower housing 20 is formed with a series of tubular sockets 22 for removably receiving the hollow shanks 23 of planting plows 24.

The planting plows are formed with two types of shanks, one type having offset shanks such as shown in Figs. 3 and 4 and the other type having straight shanks such as shown in Figs. 1, 7 and 8. By using the offset shanks of Figs. 3 and 4, the "wide" spacing rows may be obtained. The shanks are formed with rows of indentations or teeth 56 in their side and the sockets 22 contain set screws 60 which engage the teeth to lock the shanks at any desired degree of extension, depending upon the depth at which the seeds are to be planted.

The planting plows are formed with wedge-shaped, furrow forming toes at the front and with open seed channels 28 at their rear. The shanks are hollow to allow the seeds to flow to the seed channels. The lower housing 20 is formed with a flange plate 58 which bolts beneath the frame 10 by means of suitable bolts 57. The upper housing 21 is cylindrical and carries a rotatable cylindrical, seed valve sleeve 54, the upper extremity of which is flanged as shown at 55 to over-hang the top of the housing 21. The valve sleeve contains a recess or shoulder which forms a seat for the bottom of a cylindrical seed container 59.

The valve sleeve can be rotated by means of an arm 25 which projects beyond the housing 21. The arm 25 carries a set screw 26, by means of which it may be locked in any desired position. A scale 27 is placed on the housing 21, by means of which the position of the valve sleeve may be determined. The seed channels of the sockets 22 extend upwardly through the housing 20 and match with seed passages 68 in the housing 21. The seed passages 68 open to the valve sleeve 54 through the side wall of the cylindrical housing 21. The flow of seeds to the seed passages 68 is controlled by rotating the seed valve sleeve 54. The latter carries a series of ports as indicated at 29, 30, and 31. There is one of the ports 29, three of the ports 30 and one of the ports 31.

When the valve sleeve is in the position shown at Fig. 10, the port 29 is open to the central seed passage 68, the remaining two seed passages 68 are closed. If the valve sleeve is now given a one-eighth turn to the right the two ports 30 will open the two side seed passages 68 and the middle port 31 will open the middle seed passage 68 so that seeds will feed to three rows. If the valve sleeve be now given another one-eighth turn to the right, the port 31 will open the left-hand seed passage 68 and the port 29 will open the right-hand seed passage 68 leaving the center seed passage 68 closed so as to plant two, spaced-apart rows.

Therefor, by a quarter turn of the valve sleeve the machine may be made to plant a single center row, two outside rows or three rows simultaneously, and the quantity of seeds flowing to each row will be controlled by the amount of opening of the ports 29, 30, and 31.

The seeds are swept through the ports into the channels by means of a rotary disc brush 32, shown in detail in Figs. 11 and 12. The brush consists of a circular disc, to the bottom of which a series of brush holders 33 are attached by means of screws 34 which pass through slotted openings 35 in the holders. Each holder holds a tuft of bristles 36 which project outwardly around the periphery of the brush disc. The brush disc is conical in shape so that it will direct the seeds toward the periphery where they will be picked up by the brushes and swept into the ports in the seed valve sleeve 54.

The brush is mounted upon a vertical shaft 37 which extends downwardly through the bottom of the housing 21 into a gear chamber in the housing 20 where it terminates in a worm gear 38. The worm gear 38 meshes with a worm 39 mounted on a drive shaft 40. The drive shaft 40 extends through bearings in opposite sides of the housing 20 and carries a stepped pulley 41. A V-belt 42 extends between the stepped pulleys 17 and 41. The speed of rotation of the shaft 37 may be varied by changing the position of the belt and the pulleys.

The bottom of the seed container 59 is partially closed by means of a bottom plate 43. The plate 43 does not completely close the entire bottom but leaves a seed discharge opening 44. An inclined sub-bottom 45 is positioned above the bottom plate 43 to direct the seeds towards the opening 44.

The opening 44 can be completely closed by means of a rotary valve plate 46 which is pivoted to the bottom 43 on a suitable pivot pin 47. The valve plate 46 is rotated by means of a handle 48 projecting beyond the side of the container 59. The top of the seed container is closed by means of a cap 49 and the depth of the seeds therein can always be noted through a glass window 50 in the side thereof.

It will be noted that several seed containers may be employed with the same machine, each container holding a different type of seeds. Upon approaching the completion of the planting of one type, the operator closes the valve plate 46 to allow the seeds in the housing 21 to be used up. He then lifts the container 59 from place and replaces it with one filled with seeds of the second type desired. Suitable latches 67 are employed for locking the containers to the housing 21.

While the invention is particularly valuable for hand-operation in truck gardens where relatively small tracts of a large variety of different vegetables are planted. It can also be used with power operation by placing a motor support on the frame 10 such as indicated in broken line at 51 in Fig. 1 and mounting any suitable type of motor 52 thereon. The motor may be connected by means of a suitable belt 53 with the pulley 17.

The invention also is adaptable for planting a multiple series of multiple rows, that is, a plurality of the devices as shown in Figs. 7 and 8 could be mounted parallel to each other on a long beam so as to plant a plurality of multiple rows simultaneously.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A seed feeding mechanism for planters having a plurality of seeding plows comprising: a vertically-walled, open-topped cylindrical housing having a plurality of seed openings in its wall; a closed bottom in said housing; a seed conduit leading outward and downward from each seed opening to one of the seeding plows; means for sweeping the seeds from said bottom horizontally outward through said seed openings; and a vertical rotatable, cylindrical sleeve valve fitted snugly within said housing, said valve having ports in its vertical walls which may be brought into register with said seed openings to control the flow through the latter and means for rotating said sleeve valve about its axis.

2. A seed feeding mechanism for planters of the type having a plurality of seeding plows comprising: a vertically-walled, open-topped cylindrical housing having a plurality of seed openings in its wall; a closed bottom in said housing; a seed conduit leading outward and downward from each seed opening to one of said seeding plows; means for sweeping the seeds from said bottom outwardly through said seed openings;

and a vertical rotatable, cylindrical sleeve valve fitted snugly within said housing, said valve having ports which may be brought into register with said seed openings to control the flow through the latter, the ports in said valve being spaced to open one or more of said ports as desired; and means for rotating said sleeve valve about its axis to change the relative positions of said ports and openings.

3. A seed feeding mechanism for planters having a plurality of seeding plows comprising: a vertically-walled, open-topped cylindrical housing having a plurality of seed openings in its wall; a closed bottom in said housing; a seed conduit leading outward and downward from each seed opening; means for sweeping the seeds from said bottom horizontally outward through said seed openings; a vertical rotatable, cylindrical sleeve valve fitted snugly within said housing, said valve having ports which may be brought into register with said seed openings to control the flow through the latter; and means for setting said valve at any desired position in its rotation.

4. A hopper feed for a multiple row planter comprising: an open-topped cylindrical housing having a plurality of seed openings in its wall; a closed bottom in said housing; a seed conduit leading outward and downward from each seed opening; means for sweeping the seeds from said bottom horizontally outward through said seed openings; a vertical-walled rotatable sleeve valve fitted snugly within said housing, said valve having ports in its vertical wall which can be brought into register with said seed openings; and means for rotating said valve to bring one or more of said ports into register with said seed openings; and means for securing said valve at any desired position in its rotation.

ANGELO CROCE.
JOSEPH F. HEFFNER.